US008482390B2

(12) United States Patent
Castagno

(10) Patent No.: US 8,482,390 B2
(45) Date of Patent: Jul. 9, 2013

(54) REMOTE CONTROL OF APPARATUS WITH MEDIA PLAYER

(75) Inventor: Roberto Castagno, Tampere (FI)

(73) Assignee: Nokia Corporation, Espoo (FI)

(*) Notice: Subject to any disclaimer, the term of this patent is extended or adjusted under 35 U.S.C. 154(b) by 1619 days.

(21) Appl. No.: 11/556,268

(22) Filed: Nov. 3, 2006

(65) Prior Publication Data

US 2008/0109734 A1 May 8, 2008

(51) Int. Cl.
*G05B 11/01* (2006.01)
*G08C 19/16* (2006.01)
*G08C 19/12* (2006.01)

(52) U.S. Cl.
USPC ................... 340/12.22; 340/12.23; 340/13.24

(58) Field of Classification Search
USPC ................... 340/12.5, 13.24, 12.22; 348/552, 348/706; 725/80, 81, 1, 25; 341/176; 715/740
See application file for complete search history.

(56) References Cited

U.S. PATENT DOCUMENTS

| | | | | |
|---|---|---|---|---|
| 6,329,718 B1 * | 12/2001 | Van Ngo et al. | ............... | 257/765 |
| 6,636,157 B1 * | 10/2003 | Sato | ........................ | 340/825.22 |
| 6,798,459 B1 * | 9/2004 | Izumi | ........................... | 348/552 |
| 7,429,932 B1 * | 9/2008 | Newell et al. | ........... | 340/825.69 |
| 7,586,398 B2 * | 9/2009 | Huang et al. | ................. | 340/10.5 |
| 7,589,642 B1 * | 9/2009 | Mui | ........................ | 340/825.69 |
| 2003/0210337 A1 | 11/2003 | Hall | | |
| 2004/0257259 A1 | 12/2004 | Jindal | | |
| 2005/0153689 A1 | 7/2005 | Yueh | | |
| 2006/0259930 A1* | 11/2006 | Rothschild | ...................... | 725/81 |
| 2006/0288370 A1* | 12/2006 | Rothschild | ...................... | 725/51 |

FOREIGN PATENT DOCUMENTS

| | | |
|---|---|---|
| CN | 1610436 | 4/2005 |
| EP | 1 555 621 A | 7/2005 |
| EP | 1 763 149 A | 3/2007 |
| GB | 2 417 863 A | 3/2006 |
| JP | 2005277764 | 10/2005 |
| MX | 06000578 PA | 7/2006 |
| TW | 230007 B | 3/2005 |
| WO | 97/28630 A | 8/1997 |
| WO | WO 2005/025194 A1 | 3/2005 |
| WO | 2005/043484 A | 5/2005 |
| WO | 2006/001134 A | 1/2006 |

OTHER PUBLICATIONS

"Creative worldwide", Creative.com—Sound Blaster, MP3 Players, Speakers, Web Cameras and More http://www.creative.com/products/welcome.asp?category=210, Sep. 27, 2006, pp. 1-2.

(Continued)

*Primary Examiner* — Nam V Nguyen
(74) *Attorney, Agent, or Firm* — Alston & Bird LLP

(57) ABSTRACT

An apparatus is disclosed which has a media player, a local user interface, the local user interface being a primary presentation resource for the media player, a wireless communication interface, a media output port for connection to a remote media presentation device as a secondary presentation resource for the media player, and a controller. The controller is configured for receiving a wireless signal via the wireless communication interface from a remote control device designed for controlling an external device other than the apparatus. The controller is also configured for processing the received wireless signal to determine an action of the media player, and causing the media player to perform the determined action and output a result of the action to the media output port for presentation on the remote media presentation device if connected.

18 Claims, 5 Drawing Sheets

OTHER PUBLICATIONS

"SoftpediaTM", Download MOBILedit! 2.1.0.6 Free Trial—MOBILedit!—Control your mobile phone . . . http://www.softpedia.com/get/Internet/Telephony-SMS-GSM/MOBILedit.shtml, Sep. 27, 2006, pp. 1-3.

International Search Report, PCT/IB2007/003321, mailed Jul. 3, 2008.

Chinese Office Action dated Apr. 6, 2011.

Office Action from Chinese Patent Application No. 200780040832.4, dated Jul. 4, 2012.

Written Opinion from International Patent Application No. PCT/IB2007/003321 dated Jul. 3, 2008.

International Preliminary Report on Patentability from International Patent Application No. PCT/IB2007/003321 dated Jan. 13, 2009.

* cited by examiner

Providing remote control of an apparatus having a media player by a remote control device designed for controlling an external device other than the apparatus:

REMOTE CONTROL OF APPARATUS WITH MEDIA PLAYER

FIELD

The disclosed embodiments relate to electronic equipment with a media player, and more particularly to an apparatus having a media player, a local user interface being a primary presentation resource for said media player, a wireless communication interface, and a media output port for connection to a remote media presentation device as a secondary presentation resource for said media player. The invention also relates to a method of providing remote control of such an apparatus, a method of programming such an apparatus for remote control, and associated computer program products.

BACKGROUND

Electronic equipment with a media player according to the above is typically portable. Some examples are portable music players (e.g. MP3 players, Apple® iPod®) and portable video cameras (camcorders). In recent years, mobile telecommunication terminals have been introduced which, in addition to their primary purpose as means for providing telecommunications services, also act as a storage and presentation device for media. Such media is often created with the mobile terminal itself by means of a built-in camera and/or sound recorder, but it may also be downloaded or streamed into the mobile terminal from a remote site.

For the rest of this document, a mobile terminal suitable for telecommunication with a mobile telecommunications network compliant with for instance GSM, UMTS, D-AMPS, CDMA2000, FOMA or TD-SCDMA will be used as an non-limiting example of an apparatus with a media player within the meaning of the claimed invention.

The media player of the mobile terminal (or similar portable media player equipment as described above) uses the terminal's local user interface as primary presentation resource. For natural reasons, the local user interface has its limitations because of the mobile terminal's portable nature. The increasing sophistication of modern mobile terminals in terms of media recording quality and storage capacity has lead to desires from users to be able to enjoy the media content also on a remote media presentation device, such as a television set, a computer monitor or a video projector, to allow an enhanced presentation of e.g. still images, video sequences or slide-shows. Use of a remote media presentation device often provides better media presentation capabilities (e.g. bigger display screen, more colors, better resolution, higher sound quality, etc).

To this end, there are nowadays mobile terminals which have a media output port for connection to a remote media presentation device which will function as a secondary presentation resource for the media player.

Because of the high data rate required to transfer e.g. a video sequence for real-time presentation on a remote media presentation device, the mobile terminal will typically have to be connected to the remote media presentation device via a cable attached to the terminal's media output port. In turn, since the cable has limited length, the mobile terminal needs to be close to the remote media presentation device, and thus a user will have to operate the media player by holding the mobile terminal and using its local user interface while standing close to the remote media presentation device. It is apparent that this has its drawbacks for instance when the remote media presentation device is a television set, which is more comfortable to view from a distance.

SUMMARY

In view of the above, it would be advantageous to solve or at least reduce the problems discussed above. More particularly, the disclosed embodiments facilitate a user to operate an apparatus having a media player when connected to a remote media presentation device.

Generally, the disclosed embodiments relate to an apparatus, methods and computer program products according to the attached independent patent claims.

A first aspect of the disclosed embodiments relates to an apparatus comprising:

a media player, a local user interface, said local user interface being a primary presentation resource for said media player, a wireless communication interface, a media output port for connection to a remote media presentation device as a secondary presentation resource for said media player, and a controller, said controller being configured for receiving a wireless signal via said wireless communication interface from a remote control device designed for controlling an external device other than said apparatus, processing said received wireless signal to determine an action of said media player, and causing said media player to perform said determined action and output a result of said action to said media output port for presentation on said remote media presentation device if connected.

This means that the user may conveniently control the media player functionality of the apparatus remotely. Use of a remote control device designed for controlling an external device other than said apparatus is beneficial, since it avoids the need for a separate remote control device for the apparatus. Instead, benefit can be drawn from the fact that various dedicated remote control devices are typically available in for instance a home environment for controlling respective electronic equipment such as a CD (Compact Disc) player/recorder, a DVD (Digital Versatile Disc) player/recorder, a video cassette player/recorder (VCR), a television set, a multimedia receiver, a hifi amplifier, a radio receiver, a cassette tape player/recorder, an air condition system, etc. This is made possible by configuring the controller of the apparatus to process a wireless signal, as received from such a dedicated remote control device designed for another device, to determine an action of said media player, and then to cause the media player of the apparatus to perform the determined action.

By "said local user interface being a primary presentation resource for said media player" is meant that the local user interface is the normal output device for media from said media player—for instance by showing still images or video on a local display screen, and/or outputting sound through a local speaker. Correspondingly, the remote media presentation device being a secondary presentation resource for said media player means that media from the media player can be output via the media output port of the apparatus to the remote media presentation device (if connected). When the remote media presentation device is used as such a secondary presentation resource, media may either continue to be output on the local user interface (i.e., by using both the primary and the secondary presentation resource for the media player), or media may only be output to the remote media presentation device (i.e., by using only the secondary presentation resource for the media player).

Typically, the apparatus will further comprise a local memory capable of storing media data therein, wherein said action may relate to playback of media and wherein said controller's causing of said media player to perform said determined action and output said result may involve reading a media data content from said local memory, and outputting said media data content on said media output port in a format suitable for presentation on said remote media presentation device.

The local memory may for instance be a built-in electronic memory such as a flash memory, a PROM memory, an EPROM memory, an EEPROM memory or a magnetic hard disk, or an attachable memory such as a memory card or an optical disk. Alternatively, the media data content may be received from a remote data source, for instance as streaming data from a remote server over a communications network, wherein a local memory in the apparatus, such a RAM memory, serves as a temporary buffer for the incoming data stream. The media data content may define audible data (i.e. data for sound reproduction, such as MP3, AAC or WAV data), visual data (i.e. data for visual reproduction, e.g. JPEG, GIF or TIFF data for still images, or video data such as MPEG, AVI or WMA video data), or audiovisual data (i.e. data for reproduction of both sound and images, such as MPEG, AVI or WMA video data with audio included). Particularly in the latter two cases, the remote media presentation device may conveniently be for instance a television set, a computer monitor, a video projector, etc, and the media output port of said apparatus may thus be an A/V (audio/video) port compatible with a corresponding A/V port on the television set, etc (either directly through e.g. an appropriate cable, or by way of an intermediate A/V signal adapter). Correspondingly, when the media data content defines audible data, the remote media presentation device may conveniently be for instance a home stereo or hifi equipment.

In one or more embodiments, where the local user interface of the apparatus has operations for controlling the media player, the controller is configured for processing said received wireless signal by:

determining a control data content included in said wireless signal, and interpreting the determined control data content into an operation of said local user interface associated with a user command for selecting said action of said media player.

Moreover, the controller is configured for executing the interpreted operation to cause said media player to perform said action and output said result of said action.

The determined operation may for instance be a navigating or selecting command in said local user interface, including but not limited to navigating or scrolling between selectable user interface items (such as icons, select buttons, radio buttons, check boxes, pop-up menus or scroll-down menus), and selecting of such user interface items or sub-items thereof (e.g. menu items in a menu).

In one or more embodiments, the controller's execution of the interpreted operation involves replicating it on said media output port to allow presentation on said remote media presentation device.

Replicating the determined operation on the media output port will not only give a user of the apparatus full ability to control the apparatus from remote, using an already available remote control device of an external device belonging to e.g. any piece of home equipment, but in addition also allows him to do so using the familiar user interface of the apparatus. This is so because the commands given on the remote control device are interpreted into user interface operations of the apparatus, which operations are "forwarded" to the remote media presentation device to be presented thereon, in a similar manner as GUI operations on a computer are replicated and forwarded to for instance a secondary display or a projector.

Different brands of remote control devices use different "dialects", which means that a remote control device for equipment such as a television set of a first brand typically cannot control equipment of a second brand. Therefore, in one or more embodiments the present invention envisages use of pretrained driver software for different brands or manufacturers of equipment. In other words, the apparatus may comprise a driver for said remote control device, said driver being stored in a local memory of said apparatus, and said driver containing software code which, when executed by said controller, performs said interpretation by recognizing said determined control data content to mean said operation.

To this end, one or more embodiments of the apparatus further comprise a communications network interface for coupling said apparatus to a communications network, wherein said controller will be configured for downloading said driver from a network resource accessible via said communications network, and storing said driver in said local memory.

In aforementioned one or more embodiments, the apparatus is advantageously a mobile telecommunications terminal (such as a mobile (cellular) phone, a personal digital assistant (PDA) or a communicator) having a communications network interface in the form of a wireless telecommunication interface to a mobile telecommunications network which may be in compliance with any commercially available mobile telecommunications standard, including but not limited to GSM, UMTS, D-AMPS, CDMA2000, FOMA and TD-SCDMA. The network resource may be a resource within the mobile telecommunications network, or it may be a resource in another communications network connected to the mobile telecommunications network. Thus, said another communications network may for instance be the Internet, or a part thereof, and the network resource may be an Internet site in the form of e.g. an ftp, http or wap server.

As an alternative, or in addition, to a downloadable pretrained driver, one or more embodiments of the apparatus may have a mapping data structure stored in said local memory, said mapping data structure defining correlations between different possible control data contents of wireless signals from said remote control device and corresponding operations of said local user interface, wherein said controller is configured for interpreting the control data content included in said received wireless signal by matching said control data content with said mapping data structure.

Such a mapping data structure may be created as follows in one or more embodiments. Here, the controller of the apparatus is further configured for programming of said apparatus to be controllable by means of said remote control device, by at least for one operation among a plurality of operations available in said local user interface:

inviting a user to perform one command on said remote control device among a plurality of available commands;

in response to said user performing said one command, receiving a wireless signal from said remote control device;

processing the received wireless signal to determine a control data content included therein which represents said one command;

creating an association between said determined control data content and said one operation of said local user interface; and storing said association in said mapping data structure in said local memory.

Such programming functionality may be provided in the form of a wizard application in the apparatus, i.e. a software application which when executed performs the programming steps referred to above and guides the user through the process, advantageously repeatedly for a plurality of different operations in the local user interface, for which the user will perform corresponding different commands on the remote control device. An example of (a part of) such a programming sequence will be given in a later section of this document.

In one or more embodiments, which comprise(s) a communications network interface as described above, the wireless interlace may be a supplementary short-range data interface different from said communications network interface. As already mentioned, the communications network interface may advantageously be a wireless telecommunication interface to a mobile telecommunications network. For such an apparatus, e.g. a mobile terminal, use is beneficially made of an existing supplementary short-range data interface in the apparatus for novel use as a wireless interface for receiving controlling commands from a dedicated remote control device designed and originally intended for use with an external device other than the apparatus. Many pieces of home equipment (such as television sets, DVD players/recorders, CD player/recorders, multimedia receivers, hifi amplifiers, radio apparatuses, etc) are delivered with dedicated infra-red remote control devices which typically operate by transmitting infra-red control signals to the equipment it controls when the user performs a certain command on the remote control device by e.g. pressing a certain key. Therefore, it is particularly beneficial to make novel use of an infrared supplementary short-range data interface in the apparatus, such as an IrDA (Infrared Data Association) interface, for the purpose of receiving control signal from an available infrared remote control device. To this end, when the remote media presentation device is for instance a television set or a video projector, a dedicated remote control device of the latter can conveniently be used as the remote control device with which also the apparatus can be controlled. Differently put, the "remote media presentation device" and the "external device", as referred to above, may be one and the same device.

A second aspect of the disclosed embodiments relates to a method of providing remote control of an apparatus having a media player and a local user interface being a primary presentation resource for said media player, the method involving:

receiving, in said apparatus, a wireless signal from a remote control device designed for controlling an external device other than said apparatus, processing, in said apparatus, said received wireless signal to determine an action of said media player, and causing, in said apparatus, said media player to perform said determined action and output a result of said action for presentation on a remote media presentation device as secondary presentation resource for said media player.

The method of the second aspect may furthermore contain any of the functional features defined above for the first aspect of the invention.

A third aspect of the disclosed embodiments relate to a computer program product comprising machine-readable instructions which, when executed by a processor in an apparatus having a media player and a local user interface being a primary presentation resource for said media player, provides remote control of said apparatus by performing the steps of the method according to the first aspect. Furthermore, the computer program product may advantageously be executed by the controller of the apparatus according to the first aspect, i.e. by said controller acting as said processor.

A fourth aspect of the disclosed embodiments relate to a method of programming an apparatus for remote control, the apparatus having a media player and a local user interface, the method involving:

at least for one operation among a plurality of operations available in said local user interface:

inviting a user to perform one command, to be selected at the user's will among a plurality of available commands, on a remote control device designed for controlling an external device other than said apparatus;

in response to said user performing said one command, receiving a wireless signal from said remote control device;

processing the received wireless signal to determine a control data content included therein which represents said one command;

creating an association between said determined control data content and said one operation of said local user interface; and storing said association in a mapping data structure capable of defining correlations between different possible control data contents of wireless signals from said remote control device and corresponding operations of said local user interface.

A fifth aspect of the disclosed embodiments relates to a computer program product comprising machine-readable instructions which, when executed by a processor in an apparatus having a media player and a local user interface, provides programming of said apparatus for remote control by performing the steps of the method according to the fourth aspect. Furthermore, the computer program product may advantageously be executed by the controller of the apparatus according to the first aspect, i.e. by said controller acting as said processor.

Other aspects, features and advantages of the disclosed embodiments will appear from the following detailed disclosure, from the attached dependent claims as well as from the drawings.

BRIEF DESCRIPTION OF THE DRAWINGS

The disclosed embodiments will now be described in more detail, reference being made to the enclosed drawings, in which:

FIG. 3b is a schematic block diagram representing the internal component, software and protocol structure of the mobile terminal shown in FIG. 3a.

DETAILED DESCRIPTION

Figure 1:
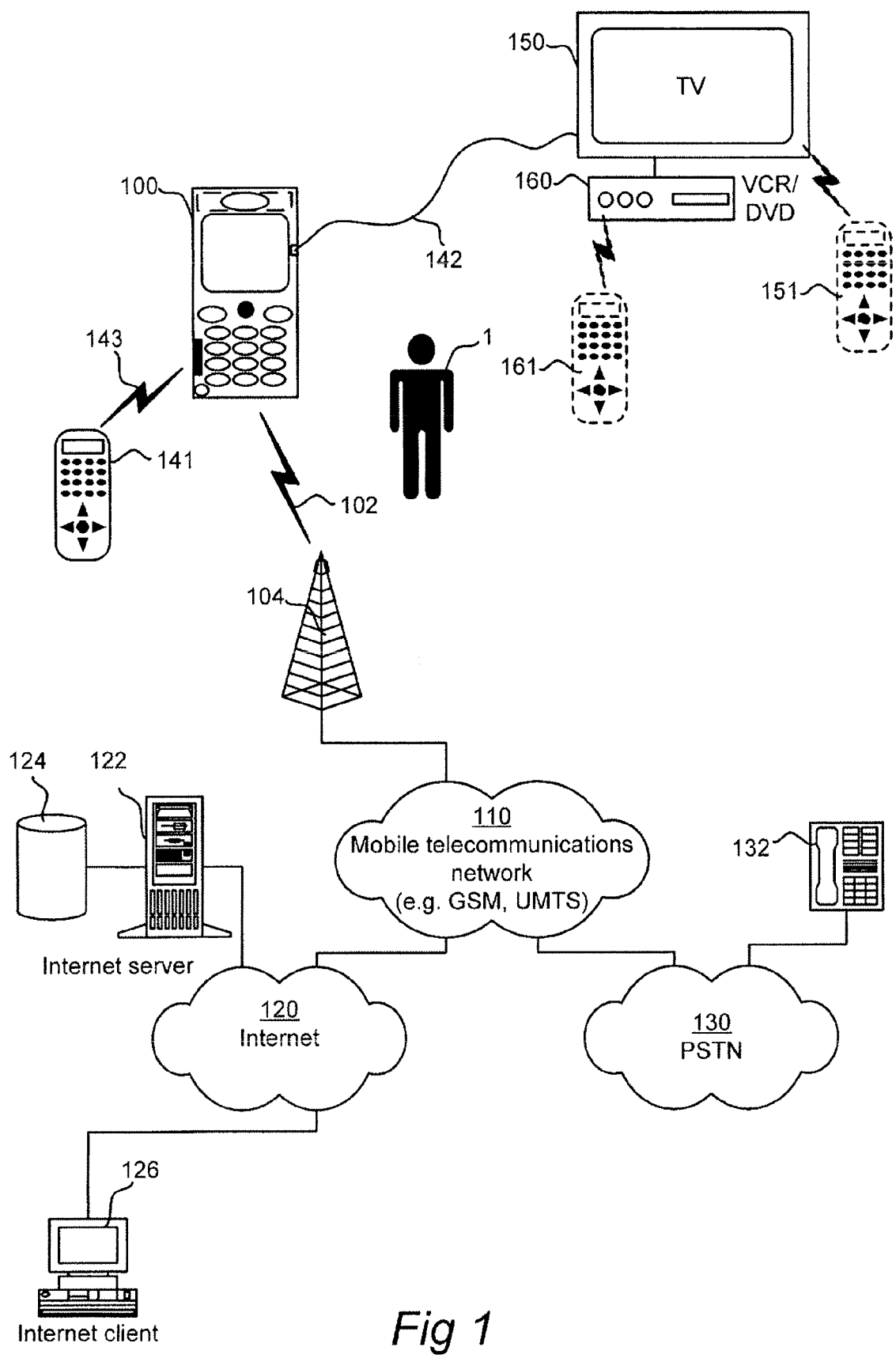
FIG. 1 is a schematic illustration of a non-limiting example of an environment in which the invention may be exercised.

FIG. 1 illustrates, in a non-limiting manner, an example of an environment in which the invention may be exercised.

In FIG. 1, an apparatus according to the invention is embodied as a mobile terminal 100 which is part of a cellular telecommunications system. In this telecommunication system, various telecommunications services such as cellular voice calls, www/wap browsing, cellular video calls, data calls, facsimile transmissions, still image transmissions, video transmissions, electronic message transmissions and electronic commerce may be performed between the mobile terminal 100 and other devices, such as another mobile terminal, a stationary telephone 132, an Internet server computer 122 or an Internet client computer 126. It is to be noted, though, that the present invention is not limited to any particular set of services or other devices.

The mobile terminal 100 is connected to a mobile telecommunications network 110 through an RF link 102 via a base station 104. The mobile terminal 100 and the mobile telecommunications network 110 may be in compliance with any commercially available mobile to GSM, UMTS, D-AMPS, CDMA2000, FOMA and TD-SCDMA. The external and internal parts of the mobile terminal 100 will be described in more detail below with reference to FIGS. 3a and 3b.

A public switched telephone network (PSTN) 130 is connected to the mobile telecommunications network 110 in a familiar manner. Various telephone terminals, including the abovementioned stationary telephone 132, are connected to the PSTN 130.

The mobile telecommunications network 110 is operatively connected to a wide area network 120, which may be Internet or a part thereof. The Internet server 122 has a data storage 124 and is connected to the wide area network 120, as is the Internet client computer 126. The server 122 with its data storage 124 may host a ftp/http/wap server capable of serving file data/http/wap content to the mobile terminal 100.

The mobile terminal 100 may be connected via a cable 142 to a remote media presentation device 150, in the form of a television set in FIG. 1. Moreover, as will be described in more detail with reference to the remaining drawings, the mobile terminal 100 may be remotely controlled from a remote control device 141. A novel functionality of the present invention is that this remote control device 141 was never designed for use with, nor delivered with, the mobile terminal 100. In contrast, the mobile terminal 100 is configured to be remotely controllable by a dedicated remote control device belonging to an external device other than the mobile terminal 100. FIG. 1 shows two possible examples of such a dedicated remote control device belonging to an external device which may be used as remote control device 141 for controlling the mobile terminal 100: a dedicated remote control device 151 for the television set 150, and a dedicated remote control device 161 for a VCR or DVD player 160.

Figure 2:
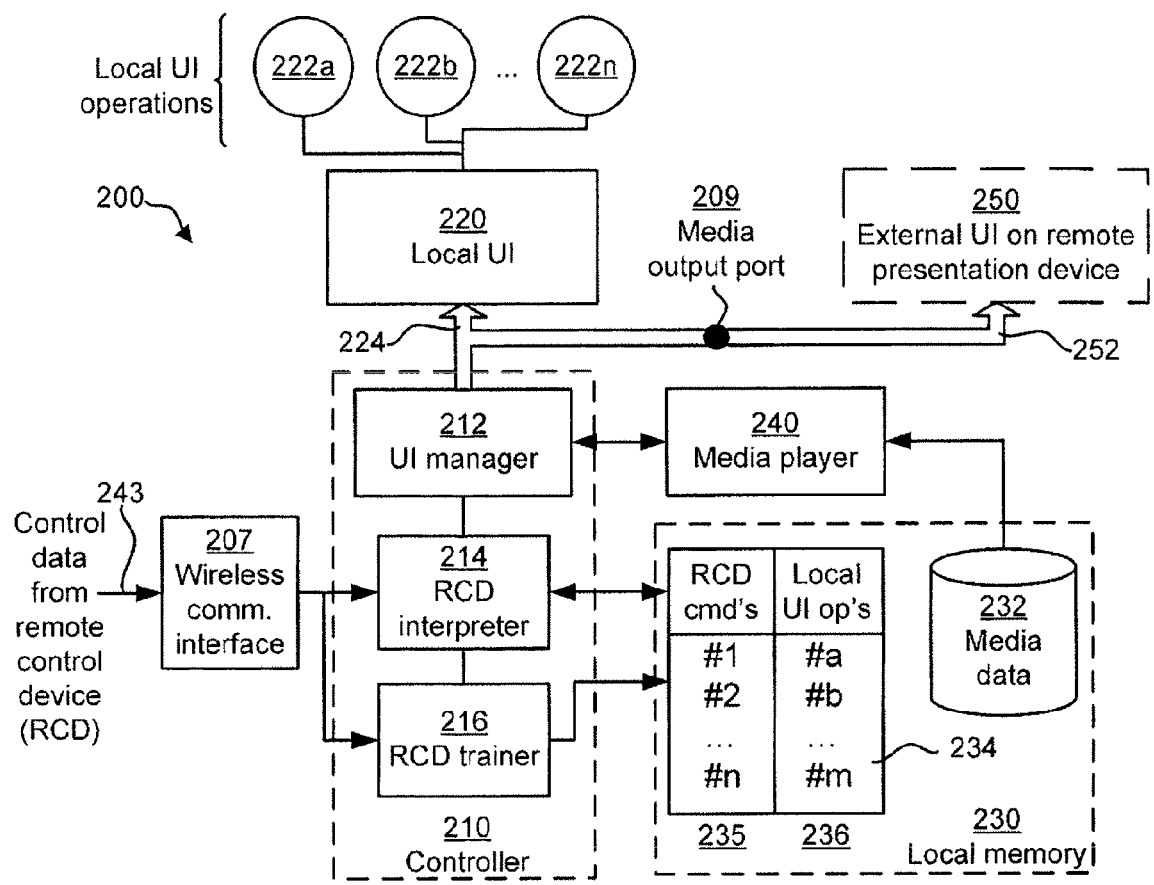
FIG. 2 is a schematic block diagram of an embodiment of an apparatus according to the invention.

Reference is now made to FIG. 2 which illustrates an embodiment 200 of an apparatus according to the invention. This embodiment may, but not necessarily, be implemented as the mobile terminal 100 of FIG. 1.

The apparatus 200 has a controller 210, a local user interface 220 and a local memory 230. A media player 240 has media data 232 stored in the local memory 230 and can be controlled by the user 1 through operations 222a, 222b, . . . , 222n. These operations may include navigating or selecting commands in said local user interface, including but not limited to navigating or scrolling between selectable user interface items boxes, pop-up menus or scroll-down menus), and selecting of such user interface items or sub-items thereof (e.g. menu items in a menu).

These operations may be commanded in the conventional way by the user 1 actuating appropriate local input device(s), such as keys and/or a joystick being part of the local user interface 220, and they may be graphically shown to the user 1 on a local output device, such as a local display screen, also being part of the local user interface 220. See 224 in FIG. 2.

The controller 210 has a UI manager 212 which captures such a local user interface operation 222a/222b/222n when performed by the user 1 and controls the media player 240 to perform an associated action thereof. The result of the thus commanded media player action is also shown on the local output device. For instance, if the commanded local user interface operation 222a/222b/222n pertains to performance (playback) of certain content among the media data 232 (which content in turn may have been selected as a result of preceding navigation/scrolling commands in the local user interface), the result of the thus triggered media playback action will be shown on the local output device as e.g. a video sequence, or a still image.

If a remote media presentation device 250 (such as for instance the television set 150 of FIG. 1) is connected to the apparatus 200 via a media output port 209, the UI manager 212 functionality of the controller 210 may replicate both local user interface operations and the results from the associated media player actions triggered by the operations to the media output port 209 for presentation on the remote media presentation device. See 252 in FIG. 2.

What has been described this far is a normal, or conventional, case where the user 1 controls the media player 240 directly through the local user interface 220 (and additionally involving replication of local user interface operations on the remote media presentation device 250, if connected).

Figure 4:
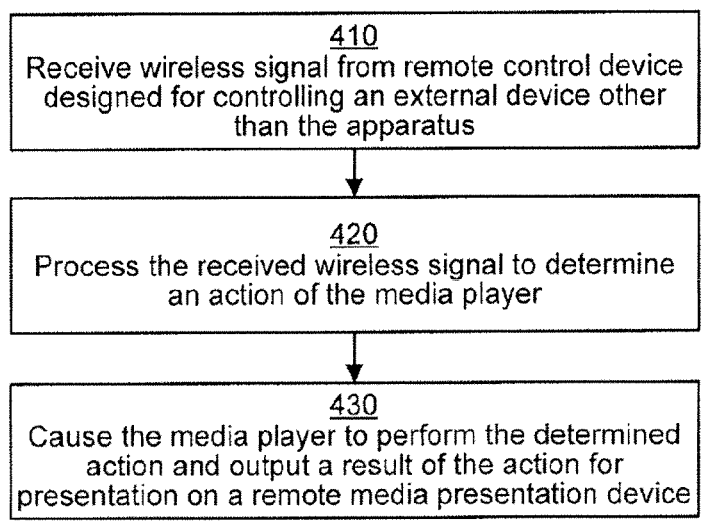
FIG. 4 is a flowchart diagram which illustrates a method of providing remote control of an apparatus having a media player by a remote control device designed for controlling an external device other than the apparatus.

In addition, as was already explained with reference to FIG. 1, the media player 240 of the apparatus 200 may be remotely controlled by a dedicated remote control device (141/151/161) designed for controlling an external device (150, 160) other than the apparatus 200. This will now be described further with reference also to FIG. 4, which shows a general remote control method, and FIG. 5, which shows a remote control method according to one embodiment. A wireless communication interface 207 of the apparatus 200 is used for receiving a wireless signal 243 (143), e.g. an infrared signal, from the remote control device. Also see step 410 of FIG. 4, and step 510 of FIG. 5. The controller has functionality 214 ("RCD interpreter") for interpreting the received wireless signal 243 by processing it to determine an intended media player action to be performed. See step 420 of FIG. 4.

Figure 5:
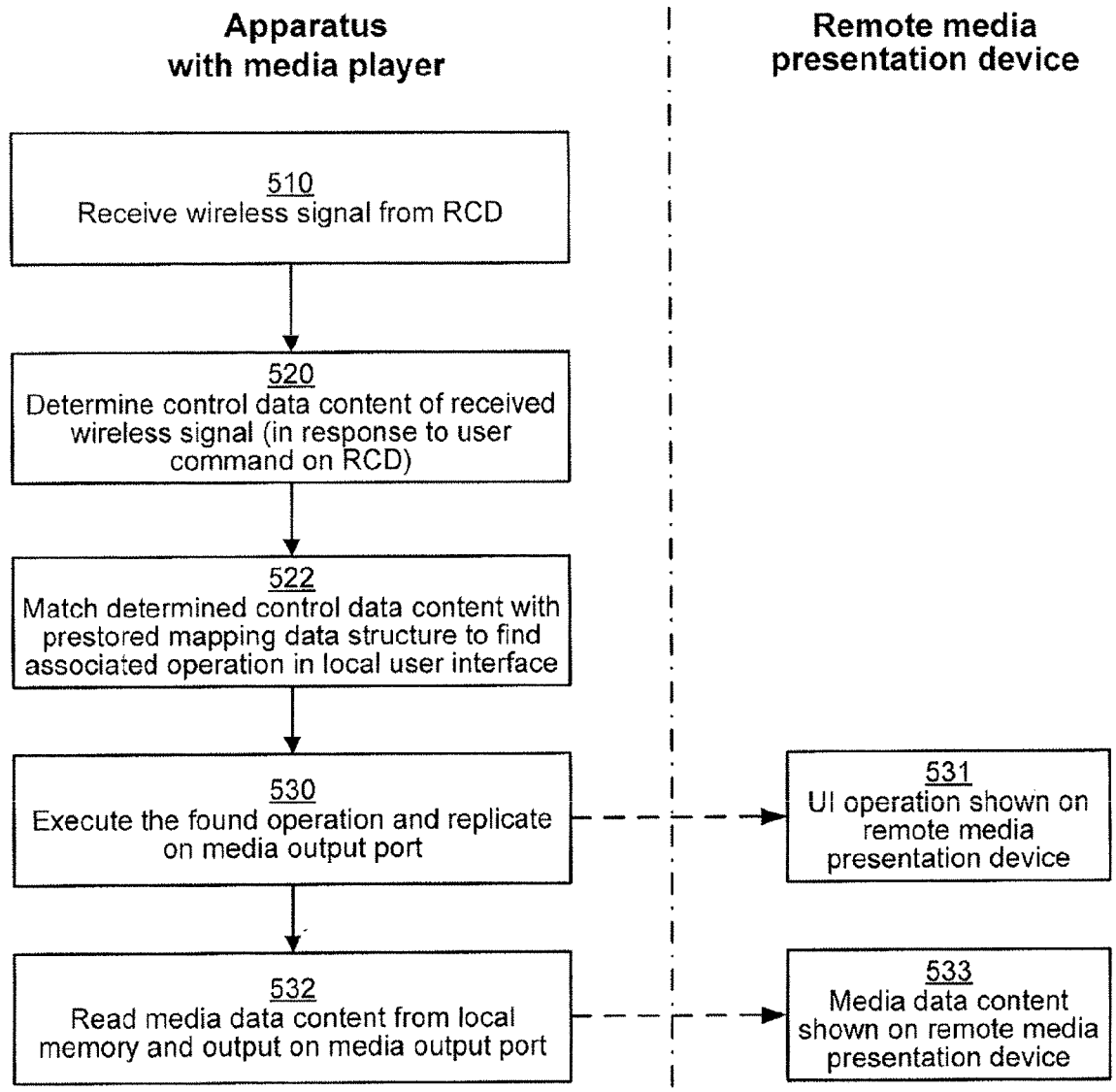
FIG. 5 is a flowchart diagram which illustrates an embodiment of the method of FIG. 4 in more detail.

In the embodiment shown in FIG. 5, the processing involves determining a control data content of the received wireless signal in step 520. This control data content may be in the form a sequence of information conveyed in an analog or digital manner in an infrared carrier signal. Then, in step 522 the determined control data content is matched with a prestored mapping data structure 234 to find a particular operation 236 among the local user interface operations 222a/222b/222n which is associated with the particular command 235 given by the user 1 on the remote control device.

Then, in step 430, the controller 210 causes the media player 240 to perform the determined action and output a result of the action for presentation on the remote media presentation device 250, as seen at 252.

In the embodiment shown in FIG. 5, this involves executing the found operation in step 530 and replicating it on the media output port 209. Thus, the user interface operation will be shown on the remote media presentation device 250 in step 531. As a result, in step 532, if the media player action is a media playback action, the controller 210 will read media data content 232 from the local memory 230 and output it on the media output port 209, wherein the media data content will be shown on the remote media presentation device 250 in step 533.

Figure 6:
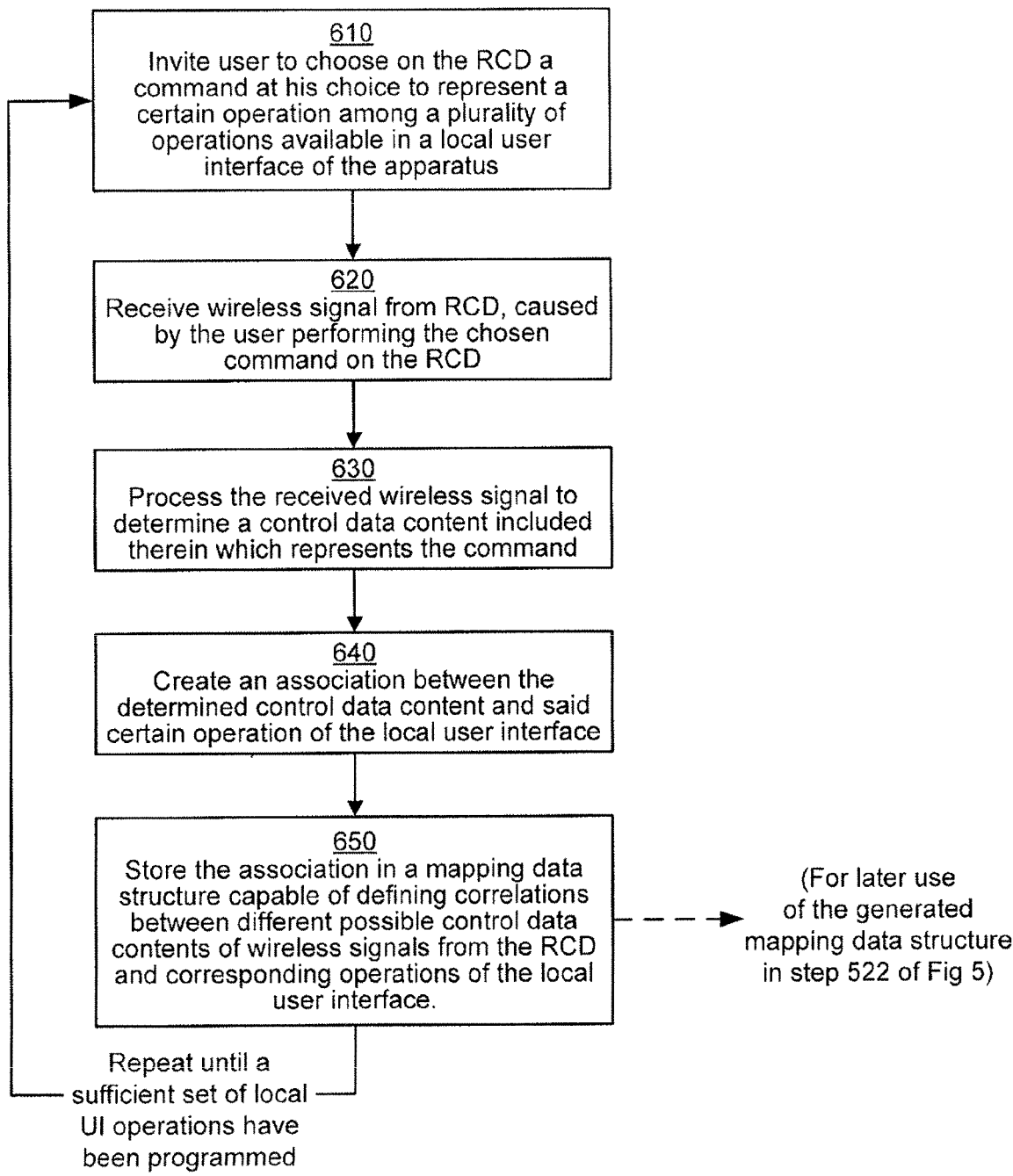
FIG. 6 is a flowchart diagram which illustrates a method of programming an apparatus having a media player for remote control by a remote control device designed for controlling an external device other than the apparatus.

A method for programming the apparatus 200 to be remotely controllable by the remote control device will now be described with reference to FIG. 6. This programming functionality is performed by the controller 210, as seen at 216 ("RCD trainer").

In step 610, the user 1 is invited (by way of an informative instruction in the local user interface 220) to choose on the remote control device a command at his choice to represent a certain operation among the plurality of operations 222a/222b/222n available in the local user interface 220 of the apparatus 200.

In step 620, a wireless signal 243 is received from the remote control device, the wireless signal being caused by the user 1 performing the chosen command on the remote control device. In response, the received wireless signal 243 is processed in step 630 to determine the control data content included therein which represents the command. In step 640, an association is created between the determined control data content and the certain operation of the local user interface 220.

Finally, in step 650 the association is stored in the mapping data structure 234 capable of defining correlations between different possible control data contents of wireless signals from the remote control device and corresponding operations of the local user interface 220. At first iteration of the programming method of FIG. 6, the mapping data structure 234 may have to be created, if not already existing.

The steps 610-650 are then repeated for other certain operations among the plurality of operations 222a/222b/222n available in the local user interface 220 of the apparatus 200, until a sufficient set of local user interface operations has been programmed.

The RCD trainer 216 may advantageously be in the form of a wizard application in the apparatus 200, i.e. a software application which when executed by the controller 210 allows the user 1 to "train" the apparatus 200 to understand the commands of the dedicated remote control device. The wizard application will perform the programming steps referred to above and guide the user 1 through the programming process, advantageously repeatedly for a plurality of different operations 222a/222b/222n in the local user interface 220, for which the user will perform corresponding different commands on the remote control device.

Thus, the wizard application may start by inviting the user 1 to "press the left key". When the user presses a "left" button on the remote control device while pointing to the apparatus, an infrared signal with a certain control data content will be received by the wireless interface 207 of the apparatus 200, wherein apparatus 200 learns to associate that command (or, more specifically, the control data content of the infrared signal generated when that command is performed on the remote control device) with, for instance, a "left" direction of a joystick included in the local user interface 220. The process may be repeated until a sufficient set of commands has been programmed (involving, for instance, the commands to be associated with "right", "down" and "up" directions of the joystick, as well as commands to be associated with a selecting and a canceling operation in the user interface).

In an alternative embodiment, the command interpretation functionality 214 and the mapping data structure 230 may be implemented by means of a pretrained driver software which has been developed for a certain type of remote control device. Such a driver will contain software code which, when executed by the controller 210, will perform the command interpretation by recognizing said different control data contents of the wireless signal 243 from the remote control device to mean different operations in the local user interface 220.

When the apparatus 200 is a mobile terminal 100, such a driver may be downloaded from a network resource (such as server 122 of FIG. 1) accessible via the mobile telecommunications network 110, and stored in the local memory 230. For instance, if the user 1 wants to use a dedicated remote control device belonging to an external device of a certain brand, type or model, the user 1 may conveniently browse to a website of the manufacturer of that certain brand, type or model, or alternatively to a website held by a manufacturer, supplier, etc, of the mobile terminal 100, or to a website provided by another service provider, such as an operator of the mobile telecommunications network 110.

In this alternative embodiment the RCD trainer 216 can be dispensed with.

Figure 3A:
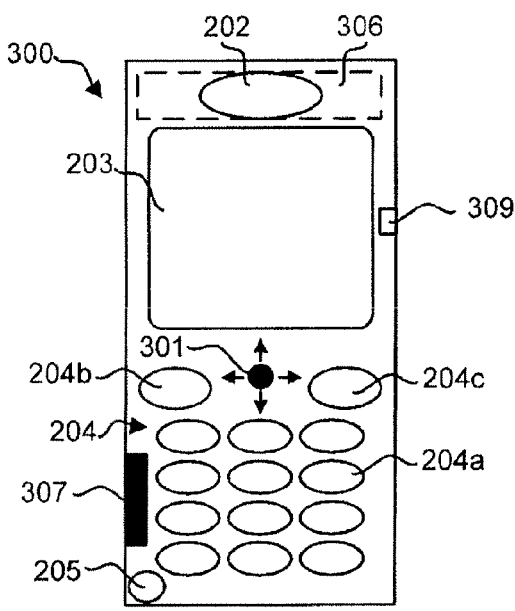
FIG. 3a is a schematic front view illustrating the external structure of an apparatus according to one embodiment, in the form of a mobile terminal.

FIG. 3a is a schematic front view illustrating the external structure of an apparatus 200 embodied as a mobile terminal 300 (which may be the mobile terminal 100 of FIG. 1).

The mobile terminal 300 comprises a speaker or earphone 202, a microphone 205, a local display 203 and a set of keys 204 which includes a 12-button keypad 204a of common ITU-T type (alpha-numerical keypad representing characters "0"-"9", "*" and "#"), and soft keys 204b, 204c. In addition, a joystick 301, or other type of navigational input device (e.g. scroll keys, touchpad, four/five-way navigation key, or rotator), is also provided. A communications network interface 306 to a mobile telecommunications network (such as network 110 of FIG. 1) is indicated by a dashed frame, since it is contained within an apparatus housing of the mobile terminal 300 and is therefore not externally visible.

The mobile terminal 300 also comprises an IrDA interface 307 which may advantageously implement the wireless communication interface 207 of FIG. 2. A media output port 309 may implement the media output port 209 of FIG. 2.

Other well known but not illustrated external components may include volume control keys, power-on button, battery, charger interface and accessory interface.

The internal component, software and protocol structure of the mobile terminal 300 will now be described with reference to FIG. 3b. The mobile terminal has a processing device 310 which is responsible for the overall operation of the mobile terminal and which may be implemented by any commercially available CPU ("Central Processing Unit") or DSP ("Digital Signal Processor"), or alternatively by any other electronic programmable logic device such as an ASIC ("Application-Specific Integrated Circuit"). The processing device 310 may implement the controller 210 of FIG. 2. The processing device has associated electronic memory 312 such as RAM memory, ROM memory, EEPROM memory, flash memory, hard disk, or any combination thereof. The memory 312 is used for various purposes by the processing device 310, one of them being for storing data and program instructions for various software in the mobile terminal, and may implement the local memory 230 of FIG. 2.

The software includes a real-time operating system 320, drivers for a man-machine interface (MMI) 334, an application handler 332 as well as various applications. The applications may include a media player application 340 (which may implement the media player 240 of FIG. 2), as well as various other applications 350 and 360.

Figure 3B:
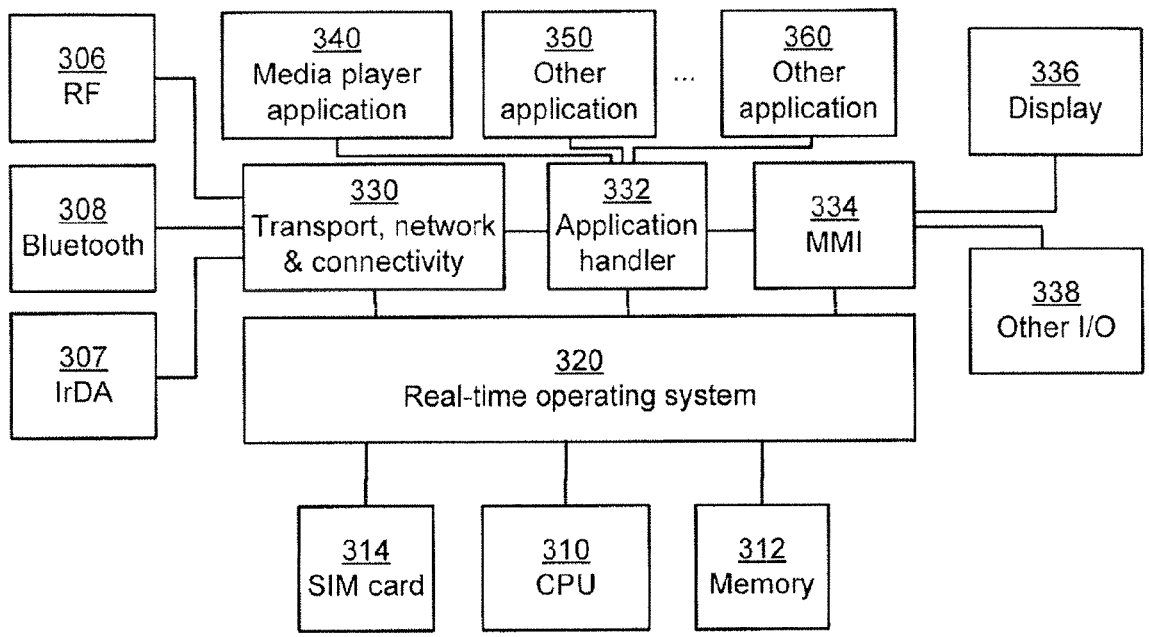

The MMI 334 also includes one or more hardware controllers, which together with the MMI drivers cooperate with a display 336/203, keys 204 and joystick 211 (commonly referred to as other I/O 338 in FIG. 3b). Such other I/O 338 may also include the microphone 205, the speaker 202, a vibrator, a ringtone generator, an LED indicator, etc. As is commonly known, the user may operate the mobile terminal through the man-machine interface thus formed. This man-machine interface may implement the local user interface 220 and the modules 212, 214 and 216 of FIG. 2.

The software also includes various modules, protocol stacks, drivers, etc., which are commonly designated as 330 and which provide communication services (such as transport, network and connectivity) for the RF interface 306, and optionally a Bluetooth interface 308. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, inter alia, band pass filters, amplifiers, mixers, local oscillators, low pass filters, AD/DA converters, etc.

The mobile terminal also has a SIM card 314 and an associated reader. As is commonly known, the SIM card 314 comprises a processor as well as local work and data memory.

In an alternative embodiment, where the apparatus with the media player is a mobile terminal, the "remote control device designed for controlling an external device other than said apparatus" as referred to in the Summary section of this document is not a dedicated remote control device designed for a certain piece of electronic equipment. Instead, in this alternative embodiment, the "remote control device" is another mobile terminal. By certain provisions which are described further below, this other mobile terminal is turned into a remote control device for the mobile terminal with the media player. A typical use case may be as follows.

Assume that the user is visiting his parents and wants to use his mobile terminal as a media player connected to the parents' TV set. He may then adapt his mother's mobile terminal to act as a remote control device for the media player of his own mobile terminal.

Such adaptation may include the following. Whereas a normal (dedicated) remote control device is factory designed to generate an infrared (IrDA) signal when a key is pressed, this will typically not be the case with mother's mobile terminal (since the IrDA interface of a mobile terminal is typically used solely for short-range data communication between a software application in the terminal and another software application at an external computer).

Therefore, it will be necessary to program also mother's mobile terminal by installing a piece of driver software, or a Java applet, etc, that gives the mobile terminal the ability to act as an infrared remote control device. Such programming software could for instance be downloaded from the Internet, or the programming software for mother's mobile terminal could be retrieved when a corresponding driver is downloaded from the Internet to the user's own mobile terminal. Then, the programming software for mother's mobile terminal could be forwarded from the user's mobile terminal to mother's mobile terminal over an available communication channel such as Bluetooth, IrDA, MMS or email.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. An apparatus comprising: a controller and a memory including program instructions, the memory and the program instructions configured to, with the controller, cause the apparatus at least to:
   receive a wireless signal via a wireless communication interface from a remote control device designed for controlling an external device other than said apparatus,
   process said received wireless signal to determine an action of a media player, said media player configured to utilize a local user interface as a primary presentation resource and a remote media presentation device as a secondary presentation resource, and
   cause said media player to perform said determined action and output a result of said action to a media output port for presentation on said remote media presentation device, wherein said media player is caused to perform said determined action and output the result of said action in response to receiving and processing the wireless signal from the remote control device.

2. The apparatus as defined in claim 1, the apparatus further comprising a local memory capable of storing media data therein, wherein said action relates to playback of media and wherein said controller's causing of said media player to perform said determined action and output said result involves reading a media data content from said local memory, and outputting said media data content on said media output port in a format suitable for presentation on said remote media presentation device.

3. The apparatus as defined in claim 1, said local user interface having operations for controlling said media player, wherein said controller is configured for processing said received wireless signal by: determining a control data content included in said wireless signal, and interpreting the determined control data content into an operation of said local user interface associated with a user command for selecting said action of said media player, and wherein said controller is configured for executing the interpreted operation to cause said media player to perform said action and output said result of said action.

4. The apparatus as defined in claim 3, wherein said controller's execution of the interpreted operation involves replicating it on said media output port to allow presentation on said remote media presentation device.

5. The apparatus as defined in claim 3, comprising a local memory, and a driver for said remote control device stored in said local memory, said driver containing software code which, when executed by said controller, performs said interpretation by recognizing said determined control data content to mean said operation.

6. The apparatus as defined in claim 5, further comprising a communications network interface for coupling said apparatus to a communications network, wherein said controller is configured for downloading said driver from a network resource accessible via said communications network, and storing said driver in said local memory.

7. The apparatus as defined in claim 3, comprising a local memory, and a mapping data structure stored in said local memory, said mapping data structure defining correlations between different possible control data contents of wireless signals from said remote control device and corresponding operations of said local user interface, wherein said controller is configured for interpreting the control data content included in said received wireless signal by matching said control data content with said mapping data structure.

8. The apparatus as defined in claim 7, the controller further being configured for programming of said apparatus to be controllable by means of said remote control device, by at least for one operation among a plurality of operations available in said local user interface: inviting a user to perform one command on said remote control device among a plurality of available commands; in response to said user performing said one command, receiving a wireless signal from said remote control device; processing the received wireless signal to determine a control data content included therein which represents said one command; creating an association between said determined control data content and said one operation of said local user interface; and storing said association in said mapping data structure in said local memory.

9. The apparatus as defined in claim 1, further comprising a communications network interface, wherein said wireless interface is a supplementary short-range data interface separate to said communications network interface.

10. A method comprising:
receiving, in an apparatus having a media player and a local user interface being a primary presentation resource for said media player, a wireless signal from a remote control device designed for controlling an external device other than said apparatus,
processing, in said apparatus, said received wireless signal to determine an action of said media player, and
causing, in said apparatus, said media player to perform said determined action and output a result of said action for presentation on a remote media presentation device as secondary presentation resource for said media player, wherein said media player is caused to perform said determined action and output the result of said action in response to receiving and processing the wireless signal from the remote control device.

11. The method as defined in claim 10, wherein said action relates to playback of media and wherein said causing of said media player to perform said determined action and output said result involves reading a media data content from a local memory of said apparatus, and outputting said media data content in a format suitable for presentation on said remote media presentation device.

12. The method as defined in claim 10, wherein processing of said received wireless signal involves: determining a control data content included in said wireless signal, and interpreting the determined control data content into an operation of said local user interface of said apparatus, said operation being associated with a user command for selecting said action of said media player, and wherein the method further involves executing the interpreted operation to cause said media player to perform said action and output said result of said action.

13. The method as defined in claim 12, wherein executing the interpreted operation involves replicating it to said remote media presentation device so as to allow presentation thereon.

14. The method as defined in claim 12, further involving downloading a driver from a network resource accessible via a communications network, storing said driver in a local memory of said apparatus, and executing software code included in said drive to perform said interpretation by recognizing said determined control data content to mean said operation.

15. The method as defined in claim 12, wherein interpreting the determined control data content into an operation of a local user interface involves matching said control data content with a mapping data structure stored in said apparatus, said mapping data structure defining correlations between different possible control data contents of wireless signals from said remote control device and corresponding operations of said local user interface.

16. A computer program product comprising machine-readable instructions which, when executed by a processor in an apparatus having a media player and a local user interface being a primary presentation resource for said media player, provides remote control of said apparatus by:
receiving a wireless signal from a remote control device designed for controlling an external device other than said apparatus,
processing the wireless signal received from the remote control device to determine an action of said media player, and
causing said media player to perform said determined action and output a result of said action for presentation on a remote media presentation device as secondary presentation resource for said media player, wherein said media player is caused to perform said determined action and output the result of said action in response to receiving and processing the wireless signal from the remote control device.

17. A method:
inviting a user to perform one command, to be selected at the user's will among a plurality of available commands, on a remote control device designed for controlling an external device other than said apparatus;
in response to said user performing said one command, receiving a wireless signal from said remote control device;
processing the received wireless signal to determine a control data content included therein which represents said one command;
creating an association between said determined control data content and an operation of a local user interface that serves as a primary presentation resource for a media player;
causing said association to be stored in a mapping data structure configured to define correlations between different possible control data contents of wireless signals from said remote control device and corresponding operations of said local user interface; and
causing the media player to perform an action and output a result of said action for presentation on a remote media presentation device as secondary presentation resource for said media player, wherein said media player is caused to perform said determined action and output the result of said action in response to receiving and processing a wireless signal from the remote control device and based upon the mapping data structure.

18. A computer program product comprising machine-readable instructions which, when executed by a processor in an apparatus having a media player and a local user interface, provides programming of said apparatus for remote control by: at least for one operation among a plurality of operations available in said local user interface:
inviting a user to perform one command, to be selected at the user's will among a plurality of available commands, on a remote control device designed for controlling an external device other than said apparatus;
in response to said user performing said one command, receiving a wireless signal from said remote control device;
processing the received wireless signal to determine a control data content included therein which represents said one command;

creating an association between said determined control data content and said one operation of said local user interface that serves as a primary presentation resource for the media player; and causing said association to be stored in a mapping data structure configured to define correlations between different possible control data contents of wireless signals from said remote control device and corresponding operations of said local user interface; and causing the media player to perform an action and output a result of said action for presentation on a remote media presentation device as secondary presentation resource for said media player, wherein said media player is caused to perform said determined action and output the result of said action in response to receiving and processing a wireless signal from the remote control device and based upon the mapping data structure.

* * * * *